United States Patent [19]
McClennon et al.

[11] Patent Number: 5,796,818
[45] Date of Patent: Aug. 18, 1998

[54] DYNAMIC OPTIMIZATION OF HANDSFREE MICROPHONE GAIN

[75] Inventors: Scott McClennon, Ottawa; Heping Ding, Kanata; David Dal Farra, Nepean, all of Canada

[73] Assignee: Northern Telecom Limited, Montreal, Canada

[21] Appl. No.: 694,124

[22] Filed: Aug. 8, 1996

[51] Int. Cl.⁶ .................................................. H04M 9/08
[52] U.S. Cl. ........................ 379/390; 379/388; 379/395
[58] Field of Search ............................ 379/390, 387, 379/388, 399, 406, 410, 420, 395

[56] References Cited

U.S. PATENT DOCUMENTS

| | | | |
|---|---|---|---|
| 4,600,815 | 7/1986 | Horna | 379/390 |
| 4,965,822 | 10/1990 | Williams | 379/390 |
| 5,343,521 | 8/1994 | Jullien et al. | 379/410 |
| 5,386,465 | 1/1995 | Addeo et al. | 379/202 |
| 5,390,250 | 2/1995 | Janse et al. | 379/410 |
| 5,471,528 | 11/1995 | Reesor | 379/390 |
| 5,600,714 | 2/1997 | Eppler, Jr. et al. | 379/390 |
| 5,612,996 | 3/1997 | Li | 379/390 |
| 5,644,635 | 7/1997 | Armbruster | 379/390 |
| 5,646,990 | 7/1997 | Li | 379/390 |

*Primary Examiner*—Krista Zele
*Assistant Examiner*—Scott L. Weaver
*Attorney, Agent, or Firm*—Jean-Pierre Fortin

[57] ABSTRACT

A system and method for dynamically optimizing the analog gain for a microphone in a telephone terminal operable in handsfree mode. The system makes use of a process whereby a relatively inexpensive analog to digital converter is used to meet gain requirements so as to accommodate the loudest echo through transmit path while maintaining an acceptable signal to noise ratio for the quietest talker. The system digital signal processor in conjunction with speech activity detection means is used to provide an optimum microphone gain under all circumstances.

11 Claims, 3 Drawing Sheets

DYNAMIC OPTIMIZATION OF HANDSFREE MICROPHONE GAIN

FIELD OF THE INVENTION

This invention relates to telephone terminals operable in handsfree mode and to a method and system for dynamically optimizing the microphone gain of such terminals so as to accommodate echo and maintain an acceptable signal to noise ratio.

BACKGROUND OF THE INVENTION

It is common for modern telephone terminals to be operable in handsfree mode. Such terminals have a loudspeaker and a microphone to permit communication with a far end user without having to hold the handset close to one's ear. A significant problem with such a system is an echo signal which results from a portion of the received signal broadcast by the loudspeaker being picked up by the microphone and retransmitted back to the far end user. This echo, if not controlled, can be very annoying to the far end user.

In order to reduce the amount of this echo signal heard by the far end user, acoustic echo cancellers (AECs) have been employed. An AEC makes an estimate of the echo signal and subtracts the estimated amount from the microphone signal which contains both unwanted echo and the wanted near end signal as generated by the near end user. This technique reduces the echo signal in the transmit path while leaving the wanted near end signal intact.

Measurements and calculations show that, because of the strong acoustic coupling between the loudspeaker and the microphone on a typical desktop handsfree platform, the level of the near end signal at the microphone could be as much as 50 dB lower than the level of the loudest echo there. The value of 50 dB below the loudest echo is for the average of the quietest talkers measured.

The analog gain, which is the gain introduced to the near end signal and echo in the analog domain, must be such that the full dynamic range of the amplifier is reached and not exceeded by the loudest possible echo. This is required so that the analog to digital converter following the analog gain produces an undistorted and full scale digital version of the echo. Such an analog gain will then result in a level of the near end signal that could be as much as 50 dB (again for the quietest talker) lower than the full scale in the digital domain.

Based on performance requirements and Integrated Services Digital Network (ISDN) set specifications, the minimum signal to noise ratio (SNR) is 44 dB. Thus, taking into consideration the previously discussed echo levels, the analog to digital converter for the system needs to have a noise floor that is 50+44=94 dB below its full scale.

Although sophisticated analog to digital converters can satisfy this requirement, they do so at substantial cost. A typical low-cost device, such as a Crystal Semiconductor Corporation's CS 4216 has a noise floor of 80 dB, i.e., 14 dB too low to meet the requirements set out above.

SUMMARY OF THE INVENTION

It is therefore an object of the present invention to provide a technique which will accommodate the loudest echo and maintain a sufficient signal-to-noise ratio for the quietest talker while using a low-cost analog to digital converter in a telephone terminal operating in handsfree mode.

Therefore, in accordance with a first aspect of the present invention, there is provided a telephone terminal operable in handsfree mode having a receive path with a digital to analog converter and a loudspeaker; a transmit path having an analog to digital converter with an analog signal amplifier and a microphone; an acoustic echo canceller communicatively coupled between the receive path and the transmit path; detector means to monitor speech activity on respective paths and; processing means responsive to the detector means. The improvement according to the invention comprises means to dynamically control the analog amplifier in dependence on speech activity.

In accordance with a second aspect of the invention there is provided a method of dynamically controlling the analog gain for a microphone in an audio system of a telephone terminal operable in handsfree mode wherein the audio system comprises a receive path having a digital to analog converter and a loudspeaker; a transmit path having a microphone and an analog to digital converter with controllable amplifier means; an acoustic echo canceller operatively coupled between respective paths; and processing means having detector means to determine speech activity on respective paths. The method according to the present invention comprising (a) setting an analog gain target, (b) determining whether the actual gain meets the gain target, and (c) dynamically adjusting gain as necessary to meet the target in dependence on speech activity on respective paths.

BRIEF DESCRIPTION OF THE DRAWINGS

The invention will now be described in greater detail with reference to the attached drawings wherein.

DETAILED DESCRIPTION OF THE INVENTION

Figure 1:
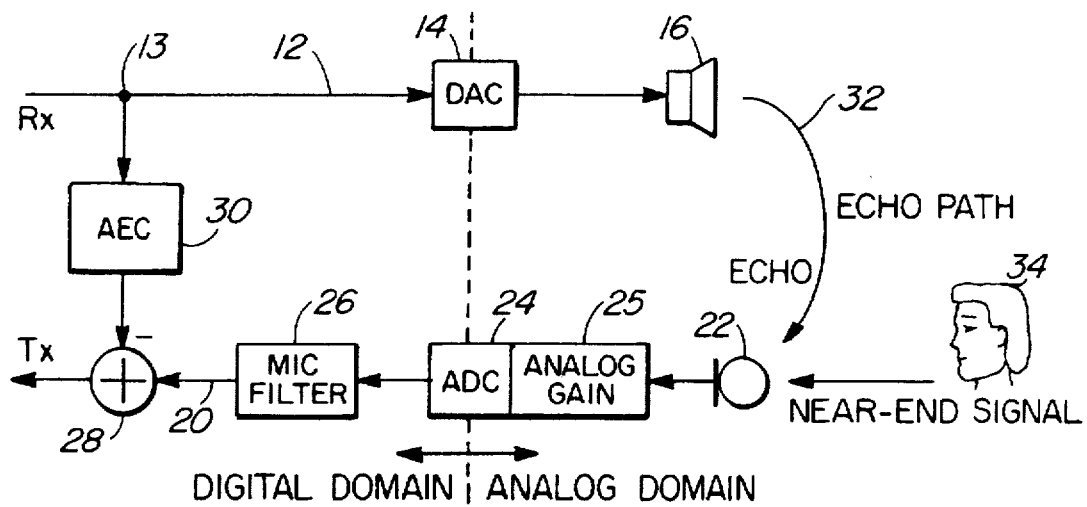
FIG. 1 is a simplified block diagram of the audio system of a typical handsfree terminal.

The block diagram of FIG. 1 shows the acoustic subsystem of a handsfree terminal having an acoustic echo canceller. As shown the subsystem includes a receive path 12 by means of which a communications signal from a far end user is accepted. The signal in digital form is converted to analog via D/A converter 14. The resulting analog signal is received by loudspeaker 16 wherein it is broadcast into the acoustic medium surrounding the speaker.

The transmit path 20 includes microphone 22 and analog to digital converter 24. Associated with A/D converter 24 is amplifier 25 for amplifying the microphone signal in the analog domain. In the digital domain, the signal is filtered by microphone filter 26. An acoustic echo canceller 30 is connected between the receive path 12 at node 13 and the transmit path 20 at subtractor 28. The signal at the output of subtractor 28 is transmitted towards the far end user (not shown).

As shown in FIG. 1, having traveled through the acoustic media along echo path 32, a portion of the far end signal broadcast by loudspeaker 16 is picked up by microphone 22. Also shown in FIG. 1 is near end user 34 who is communicating with the far end user via microphone 22 and speaker 16.

The portion of the broadcast signal picked up by the microphone is known as an echo and, if permitted to reach the far end would be annoying. In order to reduce the amount of echo heard by the far end user, an estimate of the echo is made by the acoustic echo canceller (AEC) 30 and this amount is subtracted from the microphone signal. This technique reduces the echo in the transmit path while leaving the signal attributable to the near end user intact. As indicated previously, the loudest echo in the microphone signal may be 50 dB higher than the signal generated by a quiet talking near end user. In order to accommodate this echo level and to maintain an acceptable signal to noise ratio for the quietest talker while still using a low cost analog amplifier, the present invention provides a concept of dynamically optimizing the signal level in the analog domain in all circumstances.

The invention takes into consideration the following factors:

(1) The analog gain does not have to be small enough to accommodate the loudest echo when there is little echo. This way, the analog gain can be increased to increase the dynamic range of the quietest talker in the digital domain, so as to increase the signal to noise ratio (SNR) with a constant amplifier noise floor.

(2) The analog gain must be minimized to accommodate the echo when there is one. Although the SNR for the quietest talker under this circumstance is lower than required, the effect of the poor SNR is masked by the residual echo of the AEC and therefore will not be perceived by the far-end party.

Figure 2:
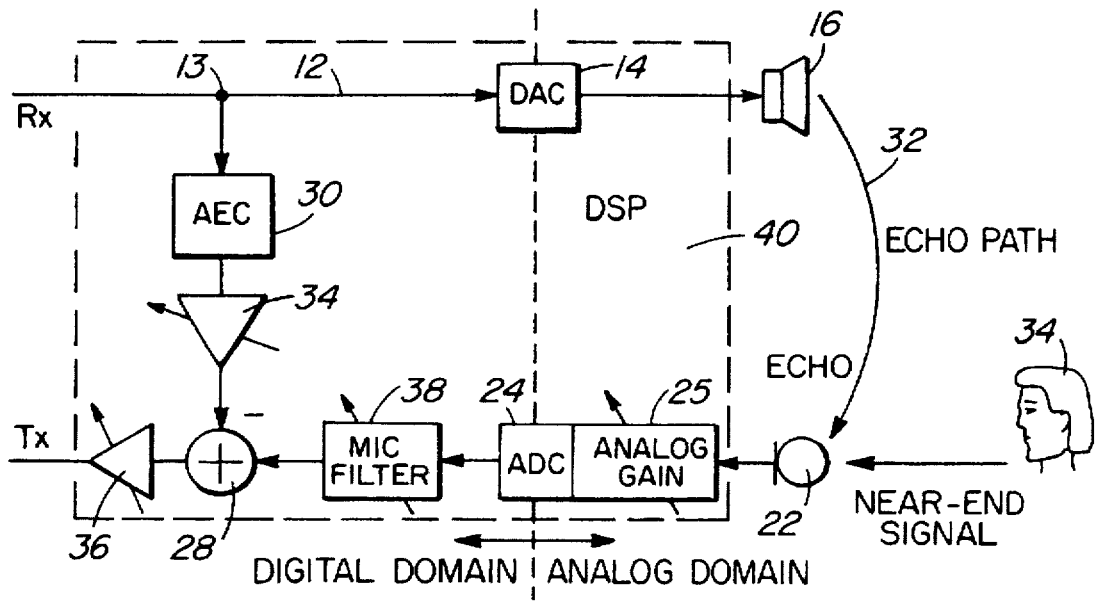
FIG. 2 is a simplified block diagram of the audio system including dynamic gain according to the present invention.

A simplified block diagram of the acoustic subsystem incorporating the invention is shown in FIG. 2. For the sake of clarity, components not directly affected by the invention are not shown in this figure. Those elements which are the same as those shown in FIG. 1 carry the same reference numerals. It can be seen from FIG. 2 that, in addition to the analog gain 25, there are three other adjustable elements, namely, an AEC output scaler 34; a transmit scaler 36; and the microphone filter's internal storage units 38.

Dynamically adjusting the analog gain results in variations in the echo path's gain as well as the transmit signal's gain in the digital domain. Thus, the AEC output and transmit signal must be dynamically scaled accordingly. These operations must be synchronous with the level changes at the corresponding point in the signal path in order to minimize the artifacts associated with the whole exercise.

Figure 3A:
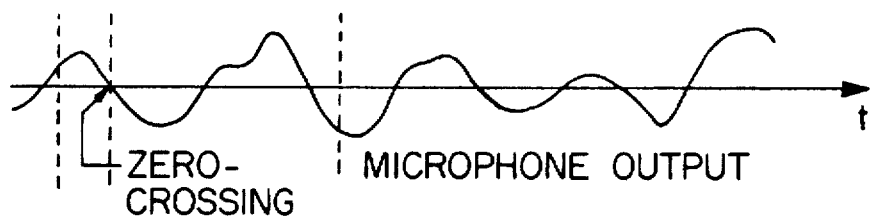
FIGS. 3A–3D graphically illustrate the analog gain adjustment relative to time for various components of the system.
Figure 3B:
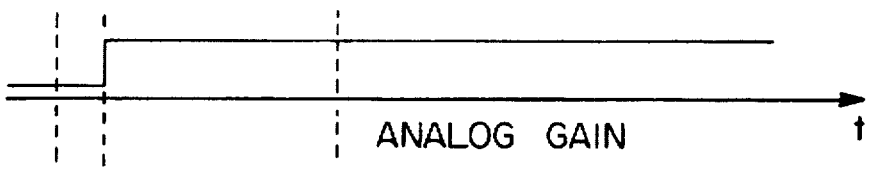
Figure 3C:
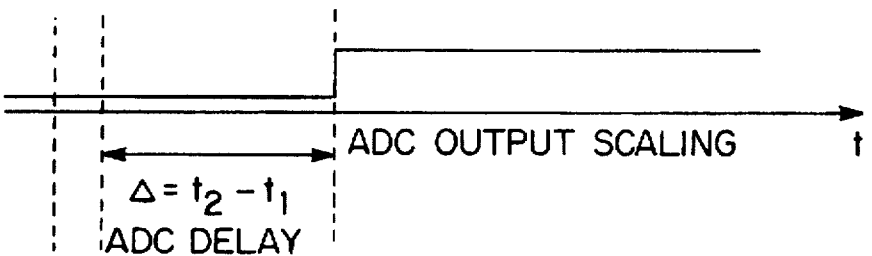
Figure 3D:
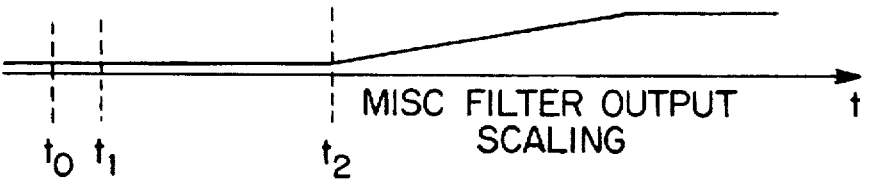

FIG. 3A–3D show graphically the relationship between the microphone output and the scaling of the microphone filter's output when an analog gain increase is instructed. FIG. 3A is a representation of the microphone output as a function of time. The analog gain of the ADC amplifier, for example, a one with CS4216, will not change immediately upon receipt of instructions to do so—time $t_0$ in FIG. 3A. The analog gain increases in conjunction with a zero-crossing in its input, i.e., time $t_1$. This is shown in FIG. 3B. The effect of the analog gain change does not show up in the digital domain until a fixed amount of time ($\Delta$) later at $t_2$. As shown in FIG. 3C, $\Delta = t_2 - t_1$. The presence of the microphone filter further complicates the problem; being a recursive filter, its output is scaled gradually upon a change in input scaling. This is shown in FIG. 3D. The delay and gradual change effects of the microphone filter's output have to be taken into consideration in the implementation of the invention.

As shown in FIG. 2, the acoustic system for dynamically optimizing the microphone gain includes variable elements which are controlled by the system's digital signal processor (DSP) 40. The control, which takes into consideration speech activity through respective paths, is such that the gain of the controlled elements is only provided when such gain is needed to meet the signal to noise ratio requirements for a quiet talker while accommodating the loudest echo.

The control is based on the establishment of an analog gain target. This target takes into consideration the requirements of the acoustic system as a function of speech activity in respective signal paths. Once the analog gain target is set the digital signal processor starts to coordinate the analog gain change and digital compensation by following the steps shown in FIG. 4 until the actual analog gain reaches the preset target.

Figure 4:
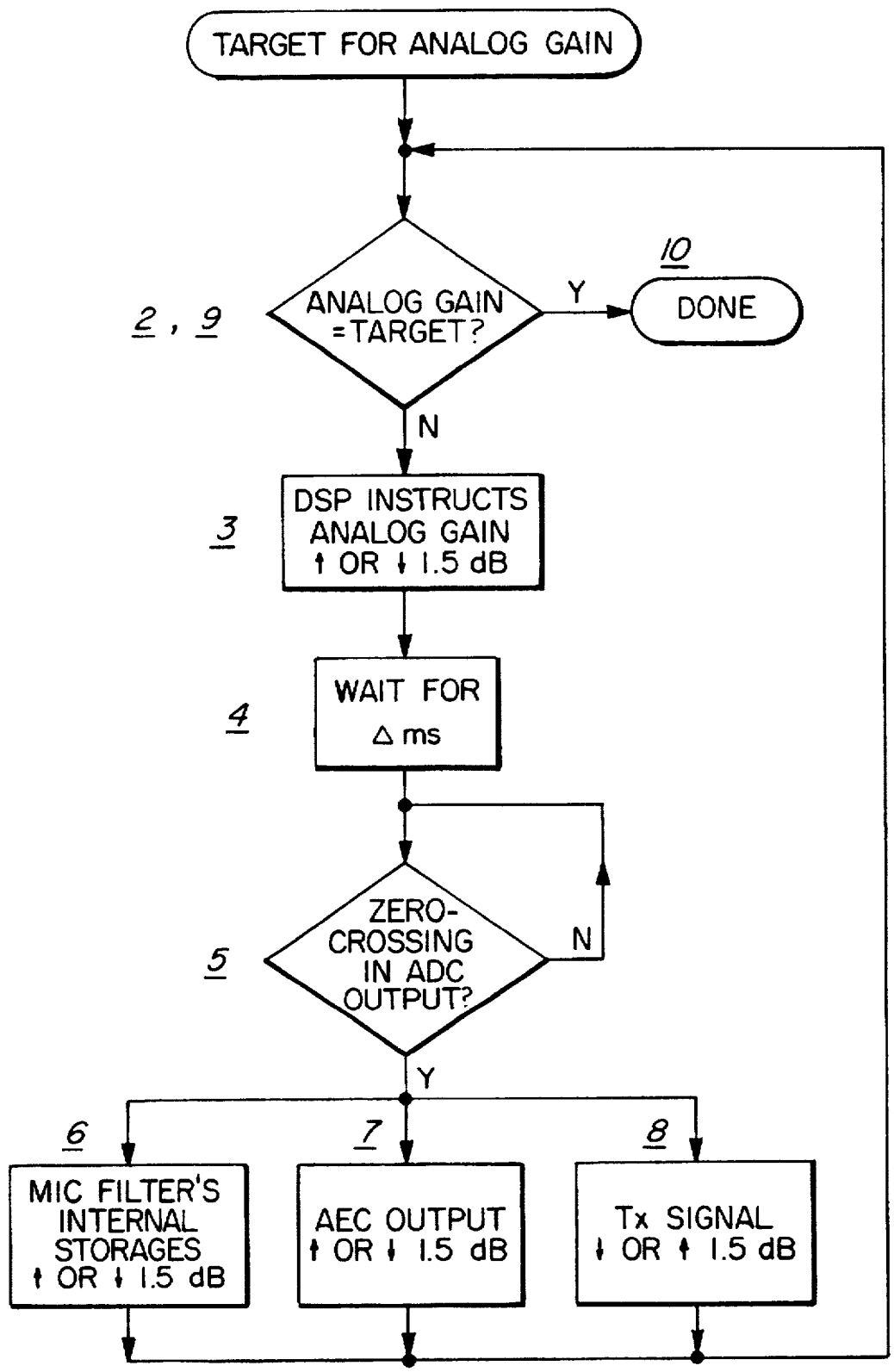
FIG. 4 is a flow diagram for the analog gain change and digital compensation.

In FIG. 4, Step 1 involves the establishment of a new analog gain target based on the system requirements. If the actual analog gain equals the target then nothing further is done until the next new target is set. If the actual gain does not meet the target the DSP sends a control word to the analog amplifier to instruct an analog gain change of 1.5 dB. The reason why such a small step size is used is to minimize the artifacts of the adjustment that might be heard at the far end. The DSP then waits for $\Delta$ ms, $\Delta$ ms being the delay shown in FIG. 3C. After the delay of $\Delta$ ms, the time it takes for a signal to propagate from the analog amplifier input to the output of the analog to digital converter, the DSP waits for a zero crossing in the analog to digital converter's output. This is the point in time when the analog gain change begins to show up in the digital domain. Once a zero-crossing is detected, which means an analog gain change was made at this signal point, the DSP starts to perform a series of digital compensations (Steps 6, 7 and 8 in FIG. 4).

The contents in the microphone filter's all internal signal storage elements, i.e., the signals in the tapped delay lines in BI-QUAD sections of the filter are all scaled by the same amount as that of the analog gain change. This establishes an implied history so that it looks as if the analog gain had always been at this new value. The application of this technique replaces the 'gain ramp', shown in FIG. 3D with a simple step gain change, so that it becomes straightforward to perform the remaining digital compensations (Steps 7 and 8).

Since the microphone filter output has been scaled, the acoustic echo canceller's output must be scaled (Step 7 in FIG. 4) by the same amount to match the former. This eliminates any possible uncancelled echo resulting from the microphone filter output scaling. Again, since the microphone filter output has been scaled, the transmit signal must be scaled by the same amount but in the opposite direction in order to counterbalance the effect of the microphone filter output scaling (Step 8).

Upon completion of Steps 3 to 8 in FIG. 4, a 1.5 dB change in the analog gain and in digital compensations has been completed. If these changes do not result in the analog gain target being met, more 1.5 dB changes are made until the actual analog gain matches the analog gain target. Once the analog gain target is reached, the task for analog gain change and the subsequent digital compensations is completed.

The present invention can be applied in handsfree telephone terminals which have an acoustic echo canceller. The concept is to dynamically optimize the analog gain for the microphone so that it is possible to achieve a good perceptual signal to noise ratio of the transmit signal with a low-cost ADC.

While a particular embodiment of the invention has been described and illustrated, it will be apparent to one skilled in the art that numerous variations and alternatives are possible. The actual scope of the invention is limited only by the appended claims.

We claim:

1. A circuit for use in a handsfree telephone terminal comprising: a receive path having a digital to analog converter and a loudspeaker; a transmit path having a microphone serially connected with an analog signal amplifier, an analog to digital converter, a microphone adjustable filter and a transmit volume scalar; a processing means including detector means to monitor speech activity on respective paths; an acoustic echo canceller communicatively coupled between the receive and transmit paths, a summing node of the echo canceller being connected serially in the transmit path and an echo canceller scalar connected serially between the echo canceller and the summing node; the processing means being responsive to said detector means for dynamically controlling the analog signal amplifier, the microphone filter, the transmit scalar and the echo canceller scalar.

2. A circuit as defined in claim 1 wherein said processing means is a system digital signal processor.

3. A circuit as defined in claim 2, said digital signal processor having means to select an analog gain target based on speech activity.

4. A circuit as defined in claim 3 wherein the gain of the analog signal amplifier is dynamically adjusted to meet said analog gain target.

5. A circuit as defined in claim 4 wherein the analog signal amplifier is adjusted incrementally a predetermined amount one step at a time in one direction, the microphone filter and the echo canceller scalar being adjusted said predetermined amount in said one direction whereas the transmit scalar is adjusted said predetermined amount but in a direction opposite to said one direction.

6. A method of dynamically controlling the analog gain for a microphone in an audio system of a handsfree telephone terminal, the audio system comprising a receive path having a digital to analog converter and a loudspeaker; a transmit path having a microphone serially connected with an analog signal amplifier, an analog to digital converter, a microphone adjustable filter and a transmit volume scalar; a processing means including detector means to monitor speech activity on respective paths; an acoustic echo canceller communicatively coupled between the receive and transmit paths, a summing node of the echo canceller being connected serially in the transmit path and an echo canceller scalar connected serially between the echo canceller and the summing node, the method comprising:

a) setting an analog gain target for the analog amplifier;

b) determining whether the actual gain of the analog amplifier meets the gain target;

c) if the analog amplifier meets the gain target, continue monitoring the speech activity on the receive and transmit paths; and d) if the analog amplifier does not meet the gain target, adjust the analog amplifier gain dynamically in an appropriate direction followed by corresponding adjustments to the microphone filter, the echo canceller scalar and the transmit scalar.

7. A method as defined in claim 6 wherein the gain of the transmit scalar is adjusted in a direction opposite to that of the adjustment to the analog amplifier.

8. A method as defined in claim 7 wherein the gain adjustments of the microphone filter, the echo canceller scalar and the transmit scalar are all adjusted a corresponding amount to that of the analog amplifier.

9. A method as defined in claim 8 wherein said adjustments are repeated until said analog gain target is met.

10. A method as defined in claim 9 wherein the gain is adjusted in discrete steps.

11. A method as defined in claim 10 wherein the step size is 1.5 dB.

* * * * *